(No Model.)
J. S. WILLIAMS.
CAR AXLE BOX.
No. 325,466. Patented Sept. 1, 1885.
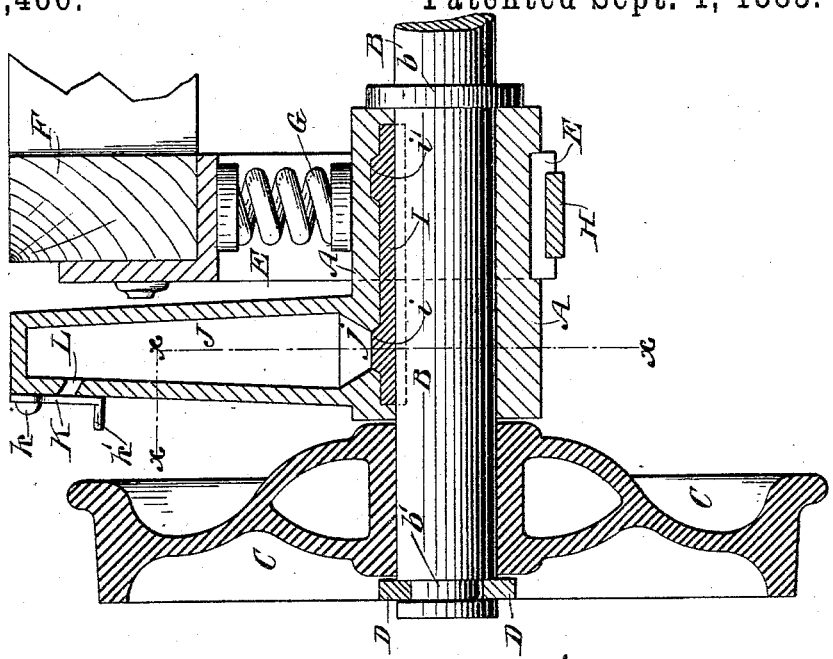
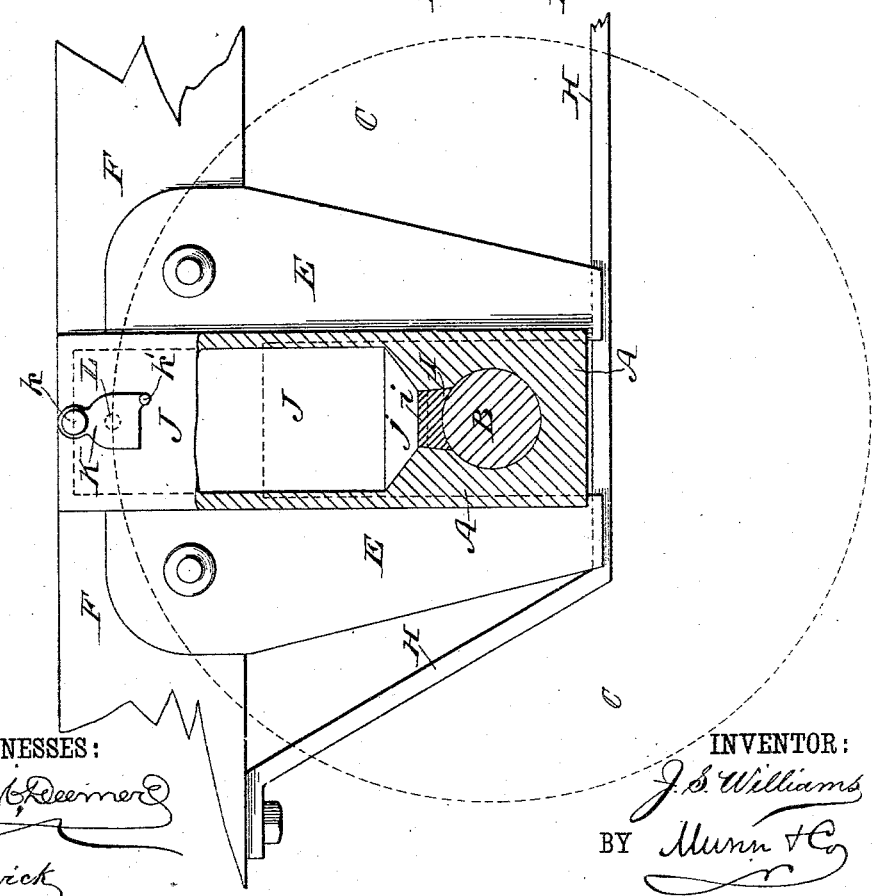

UNITED STATES PATENT OFFICE.

JESSE S. WILLIAMS, OF BEAVER DAM, KENTUCKY.

CAR-AXLE BOX.

SPECIFICATION forming part of Letters Patent No. 325,466, dated September 1, 1885.

Application filed July 9, 1885. (No model.)

*To all whom it may concern:*

Be it known that I, JESSE S. WILLIAMS, of Beaver Dam, in the county of Ohio and State of Kentucky, have invented a new and Improved Self-Oiling Journal-Box and Axle-Bearing, of which the following is a full, clear, and exact description.

My invention relates to journal-boxes and axle-bearings adapted more particularly for use on railway-cars, but applicable to other wheeled vehicles.

The invention has for its object to lessen the draft of the car or vehicle, save the lubricant, economize time in oiling the parts, and promote easier running and increased durability of the journal-boxes, axles, and wheels.

The invention consists in certain novel features of construction and combinations of the journal-box and the axle and wheel, all as hereinafter fully described and claimed.

Reference is to be had to the accompanying drawings, forming part of this specification, in which similar letters of reference indicate corresponding parts in both the figures.

Figure 1 is an end view of my improved self-oiling journal-box, partly broken away and in section, on the irregular line $x\,x\,x$, Fig. 2, and showing the outline of the car-wheel by a dotted line, and also showing adjacent parts of the car-wheel truck; and Fig. 2 is a central vertical sectional elevation taken at right angles to Fig. 1, or in the plane of the car-axle, and showing the car-wheel in full lines.

The letter A indicates the journal-box, in which the car-axle B is fitted loosely or so as to rotate in the box, and C is the car-wheel, which is placed loosely on the axle outside of the journal-box A.

The axle B has a fast collar, $b$, preferably welded on and so as to stand at the inner end of the journal-box A; and outside the hub of the wheel C the axle has a circumferential groove, $b'$, into which a ring or collar, D, is fastened or held in any approved way, these collars $b$ D preventing endwise movement of the car-axle in the journal-box and wheel, and also holding the wheel onto the axle.

At E is shown the metal frame or bearer for the car-truck F, said bearer being fitted with any approved springs, as at G, and having the usual brace-support, H; but the manner of fitting the bearer and car truck or body to the journal-box may vary as circumstances may require.

The letter I indicates a Babbitt or anti-friction metal cap-block, which is fitted into a recess in the top wall of the journal-box A, said block I having retaining-lugs $i\,i'$, as seen best in Fig. 2, the lug $i$ serving as a valve or plug to close the bottom opening, $j$, of the oil-chamber J, which is a box-like structure rising from the outer end of the journal-box A, and has capacity for holding a considerable quantity of oil or other lubricant.

At K is shown a plate or cover, which is pivoted at $k$ to the oil-chamber J at or near its top, and so as to swing down over an opening, L, through which the oil is passed into the oil-chamber when the plate K is swung up on its pivot by lateral pressure against it or a pin or finger-piece, $k'$, fixed to its lower edge.

When the car is in motion, the jar of the axle and wheel will cause sufficient movemen of the anti-friction cap-block I to allow the oil or lubricant to work its way from the chamber or reservoir J onto the axle arm or bearing and for the whole length of said bearing in the box A, and the oil will also find its way inside the hub of the wheel, so as to lubricate bearing on the axle also; and when the car stops, the lug $i$ on the block I will fit closely to the mouth $j$ of the chamber J and cut off the flow of oil therefrom, and thus avoid waste of the lubricant.

It is obvious that as the axle B revolves in the journal-box A and the wheel C revolves on the axle the friction will be greatly reduced, especially in rounding curves of the track, and as the bearings of both wheel and axle are always freshly oiled as the car starts the draft will be materially lessened, and the durability of the parts will be promoted, and as the oil is distributed evenly and only when and where required an economical use of the oil is insured, as I have amply demonstrated in practice.

I have shown and particularly described my invention as applied to railway-cars; but it is applicable also to road-wagons, carriages, buggies, or other vehicles, as will readily be understood.

Having thus described my invention, what I claim as new, and desire to secure by Letters Patent, is—

1. The combination, with the axle B of a car or other wheeled vehicle, of a journal-box, A, provided with a chamber, J, for holding a lubricant, and an interior cap-block, I, fitted in box A so as to close the outlet of chamber J and bear on the rotating axle, and be opened by the jar of travel to permit flow of the lubricant to the axle, substantially as herein set forth.

2. In combination, the journal-box A, provided with a chamber, J, an interior cap-block, I, fitted so as to close the outlet of chamber J, an axle, B, fitted to rotate in the journal-box under the block I, and a wheel fitted loosely on the axle next the journal-box, substantially as herein set forth.

3. The journal-box A, made with a body portion adapted to an axle, a superposed lubricant-chamber, J, and an interior cap-block, I, adapted to close the outlet of chamber J and to bear on the axle, substantially as herein set forth.

4. The journal-box A, made with a body portion adapted to an axle, a superposed lubricant-chamber, J, having an outlet, $j$, a supply-aperture, L, and cover-plate K, and an interior cap-block, I, having retaining-lugs $i\ i'$, the lug $i$ serving as a valve to chamber J, and said block I adapted to bear on the rotating axle, substantially as herein set forth.

JESSE S. WILLIAMS.

Witnesses:
ADAM HAVE,
F. S. GRIFFIN.